2,862,917

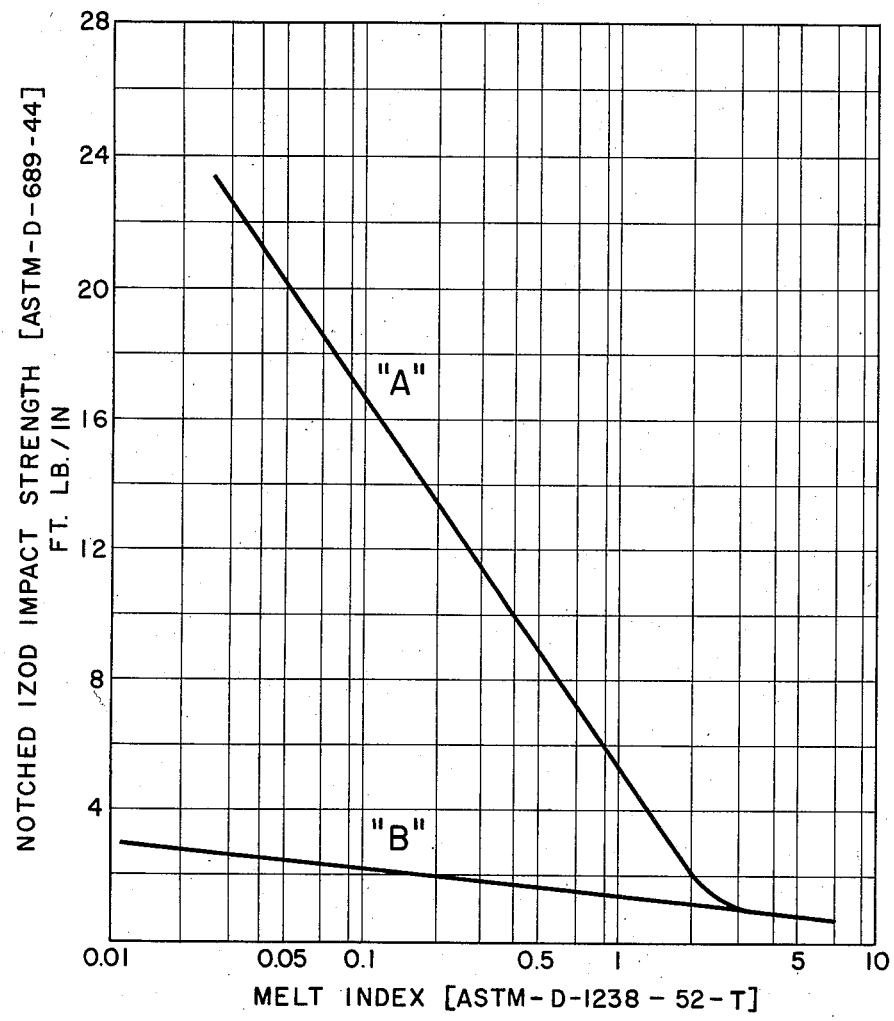

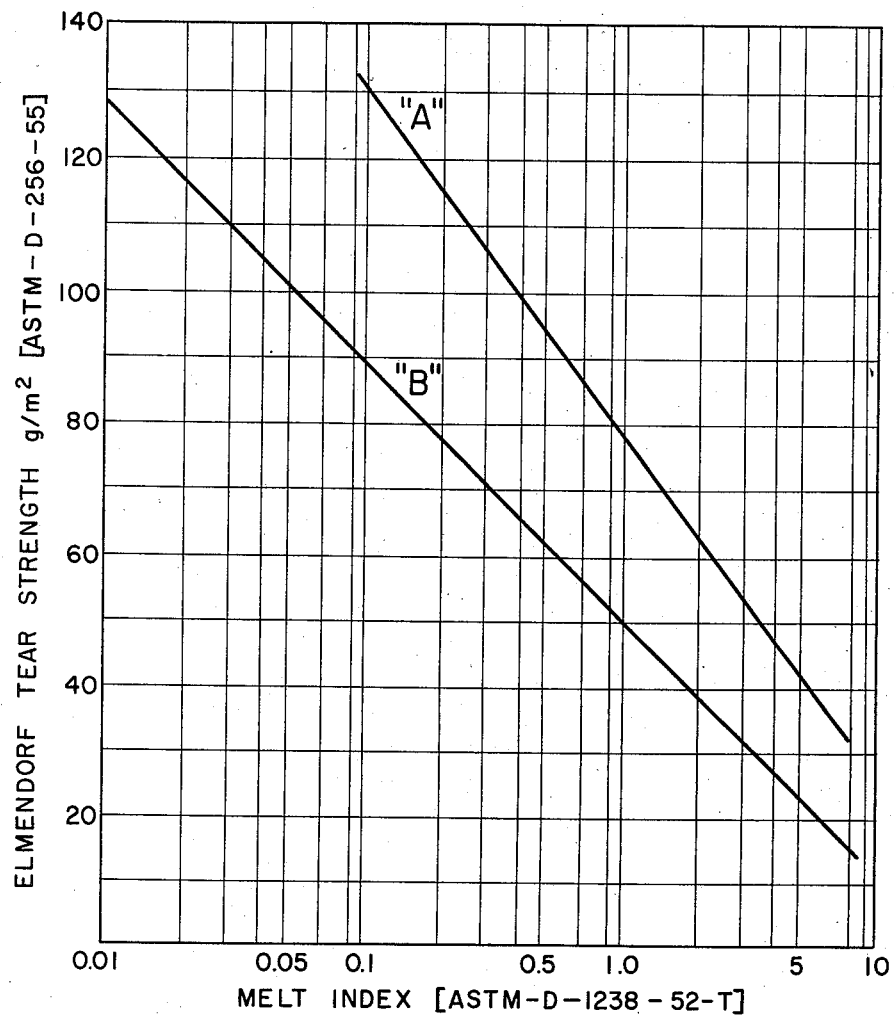

POLYMERIZATION OF ETHYLENE

Arthur William Anderson, Wilmington, John MacMillan Bruce, Jr., Claymont, and Ernest Lynwood Fallwell, Wilmington, Del., assignors to E. I. du Pont de Nemours and Company, Wilmington, Del., a corporation of Delaware Application December 6, 1955, Serial No. 551,265

17 Claims. (Cl. 260—94.9)

This invention relates to controlled polymerizations of ethylene and more particularly to a continuous polymerization of ethylene to linear polymers having predetermined melt-flow properties using a coordination catalyst system. It also relates to certain novel and useful polymer compositions having a controlled melt flow, said compositions consisting largely or almost exclusively of long unbranched polyethylene chains. This application is a continuation-in-part of S. N. 470,812, filed November 23, 1954, now abandoned.

It has been widely known that ethylene can be converted to solid polymers under very high pressures in the presence of catalysts which are capable of yielding free radicals. The solid polymers of ethylene obtained from such processes are not linear hydrocarbons as would be expected from the chemistry of vinyl polymerization, but in their formation undergo side reactions which introduce chain branching into the polymer chain structure. More recently, a novel catalyst system, described in greater detail in copending application Serial No. 450,243 and Serial No. 450,244, using an activated titanium complex as a catalyst for the polymerization of ethylene, has been discovered. This catalyst has been called a coordination catalyst, since it is believed that the reactive catalyst component coordinates with ethylenically unsaturated molecules to cause polymerization. The active catalyst system is obtained when titanium at a valence state of four is reduced. This is generally done by adding reducing or alkylating agents such as organometallic compounds or metal hydrides to titanium tetrachloride or titanium trichloride and similar tetra- or tri-valent titanium compounds. The solid ethylene polymers obtained by said novel catalyst systems exceed in density, at least to some extent, solid polyethylenes made heretofore by free radical processes except those made with liquid ethylene or at super pressures in excess of 5000 atmospheres. The polymers of ethylene obtained by coordination catalysts are furthermore characterized in that they are straight chain hydrocarbons with vinyl groups at one or both ends of at least some of the molecules. Infrared spectroscopy indicates very little methyl substitution with little or no transunsaturation or carbonyl groups. Such a polymer is hereinafter referred to as a linear polymer of ethylene. The polymers in many instances have extremely high molecular weight, and often have little or no melt flow. The polymers made by the process of this invention have been found to be homogeneous polymers.

The usefulness of linear polymers of ethylene in commerical applications, such as injection molding and melt extrusion, is determined to a large extent by two parameters, the weight average molecular weight of the polymer and the molecular weight distribution of the polymer. The weight average molecular weight determines the melt viscosity or melt flow, which decreases as the weight average molecular weight is increased as established by P. J. Flory, J. A. C. S., vol. 62, 1057 (1940). As the melt flow is decreased through increase of molecular weight, fabrication at any given temperature becomes increasingly difficult and leads to phenomena such as melt fracture. Increases in temperature will aid in fabrication, but temperature increase is limited by the stability of the polymer. A standard measure of the melt flow of the polymer is the melt index test, described in detail in the ASTM manual as ASTM–D–1238–52–T. This test is widely used to distinguish melt-flow properties of ethylenic polymers and is therefore used as such in the process of this invention. Commercial solid polyethylenes in general fall within a melt index range of 0.2 to 10.0. It is therefore of great importance that methods be found which control the degree of polymerization when using highly reactive coordination catalysts so as to control the melt flow of the resulting polymer to within the desired range of melt index values. The second parameter of polymer usefulness is the molecular weight distribution. Molecular weight distribution has a signfiicant effect on the properties of a polymer, particularly the toughness of the polymer. The toughness of a polymer of the same melt flow will increase as the molecular weight distribution is narrowed. Various measurements of molecular weight distribution have been developed such as fractionation, the ratio of the weight average molecular weight to the number average molecular weight, and the measurement of melt elasticity. Thus an improved polymer will be obtained, if means are found which will narrow the molecular weight distribution.

It is the object of this invention to provide a polymerization process, which will polymerize ethylene to a solid linear polymer having outstanding commercial utility. It is further the object of the present invention to prepare novel polymers of ethylene. Another object is to provide a process for the polymerization of ethylene wherein the molecular weight of the polymer can be accurately controlled. Another object of the present invention is to control the melt flow of the polymer within a useful melt-flow range by the reaction temperature. Still another object is to provide a continuous process for the polymerization of ethylene at high polymerization rates. Another object is to provide a polymerization process in which high rates of polymerization can be maintained while controlling the degree of polymerization within a practical level. Other objects will become apparent hereinafter.

The objects of the present invention are accomplished by a process which comprises polymerizing ethylene in a liquid hydrocarbon medium containing a catalyst formed by admixing a titanium compound of the class consisting of titanium salts and alkoxides with a compound having at least one metal-to-hydrocarbon bond, said polymerization being performed at a temperature and pressure so chosen as to maintain both the ethylene added and the polymer formed dissolved in the hydrocarbon medium, removing from the polymerization zone a solution of excess ethylene and solid polyethylene in said medium, said polyethylene having a predetermined melt flow within a melt index range of 0.005 to 10, the melt index of said polyethylene being controllable through the reaction temperature within the range of 150 to 300° C., and said polyethylene being a polymer of improved toughness.

It has thus been discovered that it is possible to control the degree of polymerization of linear polyethylene made with a coordination catalyst system by controlling the reaction temperature and other process conditions, which result in polymers of ethylene having improved physical properties. These critical process conditions include the use of temperatures such that both monomer added to the reaction mixture and the polymer formed in the reaction mixture remain dissolved in the hydrocarbon medium. The latter is achieved by employing a temperature which is above the crystalline melting point of the polymer, i. e., above the temperature at which the polymer is miscible with the solvent. The necessary ethylene solubility is achieved by the appropriate selection of solvent and pressure. As in many other polymerization processes, the quantity of ethylene present should be high enough so that the polymerization is not limited by the quantity of ethylene, i. e., that the catalyst is not starved for ethylene. It was discovered according to this invention that, if these conditions are maintained, an accurate control over the degree of polymerization can be established through the reaction temperature. The temperature range of 150 to 300° C. will encompass most useful linear polyethylenes made by coordination catalysts. The preferred control over the degree of polymerization is exercised at temperatures of 180 to 270° C. Temperatures below 150° C. are generally not employed since maintaining the polymer in solution in the presence of ethylene is difficult at such low temperatures. It was furthermore discovered that under the process conditions of the present invention linear polymers of ethylene are obtained which are improved in toughness over similar polymers made under conditions not within the critical limits of the present invention.

It has heretofore been known that ethylene could be polymerized to linear high molecular weight polyethylenes as disclosed in the Larcher and Pease Canadian Patent 502,597, issued May 18, 1954, and in U. S. Patents 2,691,647 and 2,692,647 issued October 12 and October 19, 1954, to E. Field et al. and A. Zletz, respectively (cf. also Belgian Patent 533,362 issued to K. Ziegler May 16, 1955, which discloses a "slurry process" for manufacturing polyethylene under conditions differing from the "solution process," hereinafter described). Thus it has been possible to obtain linear polyethylene over a wide range of conditions ranging from atmospheric pressure to high super pressures and from room temperatures to considerably higher temperatures employing various catalysts. However, no prior art processes have been disclosed which permit accurate control over the degree of polymerization and give continuously polymers of constant melt flow at reproducible polymerization rates. Such a process is provided by the present invention, in which the control over the degree of polymerization is achieved by the reaction temperature if both monomer and polymer are dissolved in the reaction medium during the polymerization.

Although we do not wish to be bound by the explanation which follows, it is believed that, when ethylene is polymerized in a coordination catalyst polymerization, the rate of the termination reaction controlling the molecular weight of the polymer is highly dependent on temperature. In striking contrast to free radical polymerization, the polymer molecules are not terminated by relatively rapid transfer with monomer or by transfer with telogenic organic compounds such as cyclohexane and the aliphatic hydrocarbons. Thus the degree of polymerization cannot be conveniently restricted by the addition of controlled amounts of telogens. By raising the temperature the ratio of the rate of the termination reaction to the rate of the polymerization reaction is increased, thus reducing the average chain length of the polymer and thereby making it possible to control the molecular weight through temperature.

As stated hereinabove, the catalysts useful in this invention are coordination catalysts of titanium. The nature of these catalysts is described in greater detail in copending application Serial No. 450,243. The titanium catalyst is most readily obtained by admixing a trivalent or tetravalent titanium compound of the class consisting of titanium salts and titanium alkoxides with a compound having at least one metal-to-hydrocarbon bond, such as metal alkyls, suitable compounds being lithium aluminum alkyls, aluminum alkyls, Grignard reagents, alkyl aluminum halides, tin alkyls, etc. The preferred catalysts are those where one of the catalyst components has at least one metal to halogen bond, which improves the activity of the catalyst. Such a bond may be a titanium-chloride bond or a halogen bond in the organometallic reducing agent such as in diethyl aluminum bromide. The catalyst may be formed in a prior step or may be formed in the presence of the ethylene to be polymerized. It is preferred, in the latter case, to introduce the catalyst components as a solution in the reaction solvent. Solid catalyst components, even if finely divided, may affect the accuracy of the control over the degree of polymerization as additional rate factors such as the rates of solutions of the catalyst components are introduced.

The control of the molecular weight by the reaction temperature under the necessary conditions of the polymerization process, which are maintaining both polymer and monomer in solution, is independent of the nature of the catalyst components employed. It is further possible to vary the ratios of the catalyst components, if such is desired. In general, the molecular weight or melt flow of the polymer produced in the process as measured by melt index is determined by the reaction temperature. However, the melt index, and therefore the molecular weight of the polymer, varies with each catalyst component and with each component ratio at any given temperature. At any given temperature, the effect of the ratio of the catalyst components may be small as in the case of the titanium tetrachloride/lithium aluminum alkyl system or large as in the titanium tetrachloride/aluminum alkyl system as illustrated in the examples. A change in the component ratio may cause the melt index of a polymer to increase in one catalyst system, whereas in another catalyst system a similar change will cause the melt index of the polymer to decrease, as illustrated by the examples hereinbelow. In actual practice, the preferred catalyst system and catalyst component ratio are selected by utilitarian variables, such as conversion of monomer to polymer, space-time yields of the polymer, and the quantities of catalysts required for a unit weight of polymer. It has been found that the activity of a coordination catalyst system is closely dependent upon the ratio of the components, and for this reason it is preferred to select a catalyst component ratio having a maximum utility, and vary the reaction temperature to make the desirable changes in the melt index of the resulting polymer. Thus it has been found that in the catalyst system of titanium tetrachloride and lithium aluminum tetradecyl high rates of polymerization are obtained if the equivalent ratio of the titanium compound to the alkylating agent is within the range of 0.4 to 1.4. Outside this range the rates of polymerization of ethylene under the conditions of this process decrease rapidly and permit only a limited control of the degree of polymerization or result in polymers of undesirable melt-flow properties. Thus at a catalyst ratio of 0.4 the melt flow of the polymer may be increased from 0.005 to 1.5 as the reaction temperature is raised from 150° C. to 230° C.; at a catalyst ratio of 1.4 the melt flow of the polymer may be increased from 0.008 to 3 as the reaction temperature is increased from 150° C. to 230° C. The preferred ratio of the titanium compound to this organometallic reducing agent, however, is 0.96, at which level the melt flow of the polymer produced is increased from 0.006 to 2.5 as the reaction temperature is raised from 150° C. to 230° C. The melt index, barring experimental error, is believed to be a logarithmic function of the reciprocal absolute temperature and can be determined by the experimental data hereinbelow for each desired ratio within the range hereinabove specified.

As stated hereinabove, the reaction temperature controls the melt flow of the polymer resulting from the process of this invention. However, to control the molecular weight and thereby the melt flow of the polymer, both monomer and polymer must be dissolved. Since ethylene polymers are only sparingly soluble in hydrocarbon solvents when solid but sufficiently soluble when in the melt, it is required that the temperature be above the melting point of the polymer. Thus a minimum temperature of 150° C. is necessary to assure complete melting of the polymer formed and prevent precipitation of the polymer from the reactive phase. The limits of the present system may be accurately determined from a study of a pressure temperature phase diagram of the polymer, monomer and solvent mixture. It is preferred to polymerize ethylene to a polymer concentration of 6 to 20% by weight of the solvent. Under such conditions the polymer readily dissolves in a hydrocarbon medium at temperatures above the melting point in the presence of ethylene. Since it is desirable for optimum control of molecular weight or melt flow of the polymer to make the polymerization independent of the quantity of ethylene employed, conversion of monomer to polymer is preferably greater than 10%. The conversion of ethylene to linear polymer is dependent on the quantity of catalyst added per unit quantity of ethylene. The quantity of catalyst is, in turn, dependent upon the activity of the catalyst. The pressure of the reaction system is such that it will maintain the ethylene added in the liquid (solution) phase. Such a pressure is generally above the critical pressure of ethylene and preferably in the range of 40 to 200 atmospheres. Thus a preferred system would involve an ethylene concentration of 12 to 20% by weight of the medium, having sufficient quantity of catalyst present to obtain a conversion above 50%, which would result in a polymer solution containing 6 to 20% of the polymer. The pressure required for such a system is any suitable pressure above approximately 50 atmospheres. Further illustrations are found in the examples.

As stated hereinabove, the product obtained by polymerizing ethylene with a coordination catalyst by the process of the present invention is a linear polymer of ethylene having improved toughness properties in the molecular weight range having the greatest usefulness, as compared with linear polyethylene obtained by polymerization processes employing coordination catalysts at atmospheric pressures and temperatures below 100° C. This surprising difference in toughness as measured by the Izod Impact Strength Test (ASTM D-250-55) and the Elmendorff Tear Strength (ASTM D-689-44) at the same weight average molecular weight level was traced to the molecular weight distribution of the polymer. Various techniques have been developed to estimate the molecular weight distribution of a polymer. The ratio of weight average molecular weight to number average molecular weight is particularly useful (G. Herdan, Research, vol. 3, pp. 35-40 (1950)). The weight average molecular weight is conveniently measured by solution viscosity measurements. The weight average molecular weight is calculated through the use of the Staudinger equation which is calibrated for the particular system employed by measurements of molecular weight through an absolute method such as light scattering. (P. J. Flory, Principles of Polymer Chemistry, p. 291, Cornell University Press 1953.) The number average molecular weight is determined by measurements of some colligative property such as osmotic pressure, freezing point depression and the like. A more graphic picture of the molecular weight distribution may be obtained by carefully fractionating the whole polymer into narrow fractions determining the weight average molecular weight at each fraction (measured by solution viscosity measurements, calibrated by independent and absolute methods). If the number average molecular weight of each fraction is then assumed to be equal to the weight average molecular weight of that fraction, the number average molecular weight of the total polymer may be calculated. Thus the ratio of weight to number average molecular weight can be obtained. A simpler method for measuring distribution is by measurement of the steady state compliance, which is a measurement of melt elasticity. Methods used in measuring the steady state compliance are disclosed in an article by Mooney et al. in the J. of Appl. Physics, vol. 5, p. 350 (1934). The application of this measurement to molecular weight distribution is shown in a recent article of F. Bueche in the J. of Appl. Physics, vol. 26, p. 738 (1955). In applying the measurement of steady state compliance to the process of the present invention, the following results were obtained. The unit of measurement corresponds to $0.32 \times 10^{-5}$ cm.$^2$/dyne.

As can be seen from these results, the steady state compliance will vary from 3 to 7 when the critical conditions of the process of the present invention are maintained and will rise to a range of 12 to 28 when the polymerization is carried out at conditions other than required by the process of the present invention. The effect of this difference in molecular weight distribution on the toughness of the polymer is indicated in Figures 1 and 2 of the appended illustrative drawings which cover a range of melt index values in which the polymer has the greatest usefulness. Line "A" in each figure presents the average obtained for polymers made under the conditions of the present invention using coordination catalysts disclosed in the above table. Line "B" in each of the figures represents the average obtained for polymers made under conditions outside the critical limitations of the present process using the catalyst systems disclosed in the table above. The polymers resulting in

| Catalyst system | Polymerization temperature | Polymerization pressure | Melt index of polymer | Steady state compliance of polymer |
|---|---|---|---|---|
| Tetra isopropyl titanate/diethyl aluminum bromide | Above the melting point of polymer 150-270° C. | 50 atm.-200 atm | 1.3 | 3.2 |
| Titanium tetrachloride/aluminum triethyl | do | do | 1.49 | 7.2 |
| Titanium tetrachloride/aluminum triisobutyl | do | do | 0.83 | 7.0 |
| Titanium tetrachloride/lithium aluminum tetradecyl | do | do | 1.0 | 4.4 |
| Titanium tetrachloride/diethyl aluminum bromide | Below melting point of polymer 0-100° C. | Atmospheric pressure | 1.01 | 13.1 |
| Titanium tetrachloride/aluminum triisobutyl | do | do | 0.6 | 12.0 |
| Titanium tetrachloride/aluminum triethyl | do | do | 1.4 | 28.0 |
| Titanium tetrachloride/lithium aluminum tetradecyl | do | do | 1.16 | 15.9 | line "A" have steady state compliances in the range of 3 to 7 whereas the polymers resulting in line "B" have steady state compliances in the range of 12 to 28. In general, these comparisons illustrate the difference between the product obtained by the "slurry process" and the product obtained by the "solution process" of this invention.

The process of the present invention is further illustrated by the following examples:

*Example 1*

The equipment used in the continuous process of this invention is known to those skilled in the art of continuous polymerization and is therefore described in general terms only for a better understanding of the experimental data, and may be modified without departing from the scope of the invention.

Purified ethylene gas, from which water and carbon dioxide has been removed, is passed into a heat exchanger supplied with a refrigerant and upon being liquefied is passed into a feed pump which brings the ethylene up to the desired reaction pressure. The discharge from the pump is mixed with the main solvent stream, the combined stream then flowing through a preheater and then into the agitated heated reaction vessel. The main solvent stream prior to the addition of the ethylene is purified by pumping through fixed beds of silica gel and lithium aluminum hydride and combined with a stream of solvent containing the titanium tetrachloride catalyst in solution. The co-reactant for the catalyst system is directly and separately pumped in solution to the reaction vessel.

The product stream is withdrawn from the reactor through a pressure let-down valve into a product separator where the polymer with catalyst residues precipitates from the solution and is separated from the solvent and the unreacted ethylene gas, which are separately purified and recycled. The polymer obtained from the separation is then treated with methanol to remove the catalyst residues. With the hereinabove described continuous unit using cyclohexane as the solvent, titanium tetrachloride as the metallic component of the catalyst system and lithium aluminum tetradecyl as the alklating agent at conditions set forth in the table the following yields of polymer and their melt indexes were obtained, showing how the melt index is controlled by temperature with a specific catalyst ratio.

| Run No | 1 | 2 | 3 | 4 |
|---|---|---|---|---|
| Temp., °C | 182 | 191 | 198 | 222 |
| Press., atm | 200 | 200 | 200 | 200 |
| Weight ratio cyclohexane/ethylene | 7.6 | 7.65 | 5.90 | 7.92 |
| Molar ratio TiCl$_4$/10$^6$ Moles C$_2$H$_4$ | 430 | 430 | 262 | 511 |
| Molar ratio TiCl$_4$/LiAl(nC$_{10}$H$_{21}$)$_4$ | 0.966 | 0.977 | 1.11 | 0.920 |
| Conversion in percent of ethylene | 45.7 | 53.2 | 11.9 | 20.0 |
| Yield of polymer in lbs.×10$^{-3}$/lb. mole of TiCl$_4$ | 29.1 | 34.5 | 9.9 | 11.0 |
| Melt index | 0.04 | 0.08 | 0.16 | 1.05 |

At various catalyst ratio using the same system at lower and higher temperatures, the following results were obtained.

| | At lower temperatures | | | At higher temperatures | |
|---|---|---|---|---|---|
| Run No | 1 | 2 | 3 | 4 | 5 |
| Temp., °C | 178 | 182 | 185 | 222 | 222 |
| Press., atm | 200 | 200 | 200 | 200 | 200 |
| Weight ratio cyclohexane/ethylene | 5.5 | 7.6 | 7.0 | 8.9 | 7.9 |
| Molar ratio TiCl$_4$/10$^6$ ethylene | 201 | 430 | 685 | 637 | 511 |
| Molar ratio TiCl$_4$/LiAl(nC$_{10}$H$_{21}$)$_4$ | .465 | 0.960 | 1.08 | 0.875 | .920 |
| Conversion in percent of ethylene | 52.3 | 45.7 | 55.3 | 19.0 | 20.0 |
| Yield of polymer in lbs.×10$^{-3}$/lb. mole of TiCl$_4$ | 72.1 | 29.1 | 37.7 | 9.1 | 11.0 |
| Melt index | .03 | 0.04 | 0.05 | 1.0 | 1.05 |

*Example II*

Employing the continuous polymerization system described in the preceding example differing only in the method of catalyst addition, in that the catalyst components were admixed in a separate solvent stream prior to addition to the ethylene in the reactor, the following results were obtained using a catalyst system comprising titanium tetrachloride and aluminum triisobutyl.

| Run No | 1 | 2 | 3 |
|---|---|---|---|
| Temp., °C | 202 | 219 | 240 |
| Press., atm | 54 | 54 | 54 |
| Weight ratio cyclohexane/ethylene | 11.6 | 8.7 | 14.4 |
| Millimoles of TiCl$_4$ per liter of cyclohexane | 2.26 | 4.20 | 3.38 |
| Ratio of TiCl$_4$/Al(isobutyl)$_3$ | 0.795 | 1.15 | 1.08 |
| Conversion in percent of ethylene | 60.9 | 43.4 | 17.8 |
| Yield of polymer in lbs.×10$^{-3}$/lb. mole of TiCl$_4$ | 116 | 65.4 | 19.4 |
| Melt index | 0.14 | 0.64 | 3.1 |

The effect of varying the ratio of the catalyst compositions is shown in the table below.

| Run No | 1 | 2 | 3 | 4 |
|---|---|---|---|---|
| Temp., °C | 210 | 211 | 211 | 210 |
| Press., atm | 54 | 54 | 54 | 54 |
| Weight ratio cyclohexane/ethylene | 13.0 | 10.6 | 6.6 | 7.6 |
| Millimoles of TiCl$_4$ per liter of cyclohexane | 5.7 | 6.15 | 3.25 | 4.5 |
| Ratio TiCl$_4$/Al(isobutyl)$_3$ | 1.72 | 1.35 | 0.75 | 0.478 |
| Conversion in percent of ethylene | 17.8 | 32.9 | 60.5 | 39.0 |
| Yield of polymer in lbs.×10$^{-3}$/lb. mole of TiCl$_4$ | 12.2 | 25.4 | 153 | 115.0 |
| Melt index | 19.5 | 6.24 | 0.18 | 0.08 |

As compared to the previous example, this catalyst system shows a wide variation of melt index with catalyst component ratio, which in the present instance may be employed as an auxiliary means to control molecular weight.

*Example III*

Employing the polymerization disclosed in Example II the following results were obtained employing a catalyst comprising tetraisopropyltitanate and diethyl aluminum bromide.

| Run No | 1 | 2 | 3 | 4 |
|---|---|---|---|---|
| Temp., °C | 198 | 200 | 222 | 262 |
| Press., atm | 54 | 54 | 54 | 54 |
| Weight ratio cyclohexane/ethylene | 24 | 12.8 | 7.9 | 15.0 |
| Millimoles of Ti(O-i-prop)$_4$ per liter of cyclohexane | 7.5 | 4.0 | 5.5 | 6.4 |
| Ratio of Ti(O-i-prop)$_4$ to Et$_2$AlBr | 0.33 | 0.27 | 0.31 | 0.31 |
| Conversion in percent of ethylene | 27.5 | 22.2 | 13.2 | 26.2 |
| Yield of polymer in lbs.×10$^{-3}$/lb. mole of TiCl$_4$ | 8.4 | 12.8 | 16.4 | 12.9 |
| Melt index | 0.10 | 0.14 | 0.56 | 6.7 |

*Example IV*

Employing the polymerization system disclosed in Example II the following results were obtained with a catalyst system comprising diisopropoxy titanium dichloride and aluminum triisobuytl.

| Run No | 1 | 2 | 3 |
|---|---|---|---|
| Temp., °C | 207 | 228 | 245 |
| Press., atm | 54 | 74 | 78 |
| Weight ratio cyclohexane/ethylene | 10.2 | 7.8 | 12.9 |
| Millimoles of Ti-(O-i-prop)$_2$Cl$_2$ per liter of cyclohexane | 4.13 | 4.3 | 4.5 |
| Ti(O-i-prop)$_2$Cl$_2$/Al(i-butyl)$_3$ ratio | 0.735 | 0.775 | 0.730 |
| Conversion in percent of ethylene | 38 | 32.8 | 24.1 |
| Yield of polymer in lbs.×10$^{-3}$/lb. mole of Ti(O-i-prop)$_2$Cl$_2$ | 41.5 | 52.5 | 20.5 |
| Melt index | 0.067 | 0.34 | 1.95 |

The effect of changing the catalyst component ratio is illustrated in the table below.

| Run No | 1 | 2 | 3 | 4 |
|---|---|---|---|---|
| Temp., °C | 228 | 218 | 220 | 222 |
| Press., atm | 74 | 54 | 54 | 54 |
| Weight ratio cyclohexane/ethylene | 7.8 | 14.7 | 12.2 | 14.3 |
| Millimoles of Ti(O-i-prop)$_2$Cl$_2$ per liter of cyclohexane | 4.3 | 5.7 | 5.9 | 3.0 |
| Ti(O-i-prop)$_2$Cl$_2$/Al(i-butyl)$_3$ ratio | 0.775 | 0.64 | 0.5 | 0.36 |
| Conversion in percent of ethylene | 31.8 | 6.9 | 31.5 | 13.1 |
| Yield of polymer in lbs.×10$^{-3}$/lb. mole of Ti(O-i-prop)$_2$Cl$_2$ | 52.5 | 7.9 | 12.8 | 13.2 |
| Melt index | 0.34 | 1.98 | 5.3 | 14.8 |

The change of molecular weight as indicated by melt index measurements with decreasing Ti/Al ratio is the reverse of that obtained with catalyst systems illustrated in the preceding examples; while in the preceding examples decreasing the ratio caused a decrease in melt index, and therefore an increase in molecular weight, the system employed in this example results in polymers having lower molecular weights as the Ti/Al ratio is decreased.

Example V

The molecular weight distribution of linear polyethylene made above and below the melting point of the polymer ("solution polymer" vs. "slurry polymer") was prepared and measured by the following procedures.

*Slurry polymer.*—Into a glass vessel equipped with stirrer, reflux condenser, inlet and outlet means was charged under a blanket of nitrogen 2 liters of cyclohexane containing the product formed by admixing 7.5 millimoles of titanium tetrachloride and 2.5 millimoles of lithium aluminum tetradecyl. The reaction vessel was heated to 50° C. and the nitrogen replaced by ethylene at atmospheric pressure. The reaction mixture was agitated and maintained at that temperature until the ethylene uptake in the reaction vessel had become insignificant. The resulting polymer was filtered, and washed with methanol. 200 g. of a white polymer was obtained.

*Solution process.*—Employing the process equipment disclosed in Example I, a stream of liquid ethylene and cyclohexane was fed to the reactor at a rate of 3.38 lbs. per hour and 22 lbs. per hour respectively. Titanium tetrachloride was added to the reactor feed at the rate of 17.4 millimoles per hour. In a separate stream, lithium aluminum tetradecyl was fed into the reactor at the rate of 22.4 millimoles per hour. The lithium aluminum tetradecyl was dissolved in a minimum of cyclohexane. The temperature of the reactor was maintained at 227° C. and the pressure at 2000 lbs. per square inch. The conversion in the reactor was 48.8% and polymer was obtained at the rate of 1.65 lbs. per hour.

Samples of the polymer made by the solution process and the slurry process were dissolved in boiling xylene and fractionated, using dimethylphthalate as the fractionating agent. The weight average molecular weights of the over-all polymers and the polymer fractions were measured by solution viscosity at a temperature of 125° C., using α-chloronaphthalene as the solvent. The molecular weights were calculated from the inherent viscosity employing appropriate equations for linear polyethylene. The number average molecular weights were calculated from the fractions by solution viscosity measurements with the assumption that the ratio of weight average to number average remained one within the individual fractions. The following results were obtained.

|  | Slurry | Solution |
|---|---|---|
| Weight average molecular weight | 184,000 | 160,000 |
| Number average molecular weight | 15,000 | 33,000 |
| Ratio of weight average to number average molecular weight | 12.3 | 4.9 |
| High molecular weight fraction | 750,000–1,000,000 | 500,000–700,000 |
| Weight percent | 20 | 10 |
| Medium molecular weight fraction | 50,000–150,000 | 50,000–150,000 |
| Weight percent | 25 | 37 |
| Low molecular weight fraction | >10,000 | >10,000 |
| Weight percent | 25 | 12 |

The results show that the molecular weight distribution obtained by the solution process is significantly narrower than is possible by the slurry process at approximately the same weight average molecular weight level.

The above examples have illustrated that by the process of the present invention the melt flow of linear polyethylene made by using a coordination catalyst can be accurately controlled through the reaction temperature. This control is not obtained if the polymer and sufficient monomer is not maintained in solution, which is, from a practical standpoint, only feasible at temperatures above the melting point of the polymer. The control over the degree of polymerization has been shown not to be limited to specific catalyst components and their ratios. The logarithm of the rate of change has been shown to be the same for each catalyst system. The above examples have further illustrated that the product obtained by the process of the present invention varies in structure from linear polyethylene made at temperatures below the melting point of the polymers, i. e. under condition where the polymer does not remain dissolved in the solvent. This change in structure causes an improvement in the physical properties of the polymer, particularly in the toughness of the polyethylene made by the process of the present invention.

The polymerization process according to the present invention takes place most satisfactorily when the polymerization mixture is substantially moisture free and also free of other sources of hydroxyl groups, which tend to inactivate the catalyst. As in numerous other ethylene polymerization processes, the polymerization mixture in the process of this invention is preferably kept free of oxygen since oxygen reacts with the catalyst. In practical operations, the oxygen content should preferably be held below 20 parts per million. The preferred reaction media in which continuous one-phase polymerizations of ethylene as described hereinabove carried out are hydrocarbons such as benzene, cyclohexane, n-hexane, butane, pentane, heptanes, and the like. Certain compounds should be preferably avoided as reaction media, for they will form stable complexes with the titanium coordination catalyst which will prevent further use of said catalysts in the polymerization. In this category are ketones and esters.

The process of this invention is not only useful in the manufacture of linear ethylene homopolymers but is effective also in the manufacture of such copolymers as ethylene-propylene, ethylene-butadiene, and other ethylene copolymers in which the comonomer is a compound containing an ethylenic bond. Other ethylenically unsaturated monomers such as propylene, butene-1, and the like are also polymerizable by the process of this invention and the molecular weight of the resulting polymer controllable if such monomers are polymerized in a one-phase system. To do such, it is only necessary that the monomer and the resulting polymer are soluble in the hydrocarbon solvent.

The advantages gained by the process of this invention are apparent from the discussion hereinabove. Thus, it is possible to control the melt flow of linear polymers of ethylene accurately. The process of this invention is a continuous process, the advantages of which are well known to those skilled in the art. Furthermore, efficient use of the catalyst is made, thus reducing the cost and keeping catalyst residues to a minimum in the polymer. The polymer is obtained in solution which avoids cumbersome expensive and time-consuming removal of the polymer from the reaction vessel, necessary in many other ethylene polymerization techniques. The dissolved polymer can be precipitated in a pure form and expensive washing techniques are avoided. Other advantages of this process lie in the superior properties of the linear ethylene polymers, such as improved stiffness.

The linear ethylene polymers precipitated from the solution obtained by the process of this invention are highly valuable in numerous applications, especially in the form of films, molded and extruded articles, such as pipe, extruded insulation on wire, filaments, impermeable coatings for paper, etc.

We claim:

1. The process of polymerizing ethylene to a solid polymer having a melt index value within the range of 0.005 to 10 and a steady state compliance within the range of 3 to 7 which comprises introducing ethylene and an inert non-polymerizable solvent therefor into a reaction zone, polymerizing said ethylene in said reaction zone with a catalyst formed by admixing a titanium compound of the class consisting of titanium salts and titanium alkoxides with a compound having at least one metal-to-hydrocarbon bond, maintaining said reaction zone at a temperature above the melting point temperature of said polymer of ethylene, and maintaining in said reaction zone an excess of ethylene in said solvent, and recovering a polymer of ethylene having a steady state compliance of 3 to 7 and a melt index within the range of 0.005 to 10.

2. The process as set forth in claim 1 wherein the titanium salt and the compound having at least one metal-to-hydrocarbon bond are soluble in the inert polymerization solvent.

3. The process of polymerizing ethylene to a solid polymer of melt index within the range of 0.005 to 10 and a steady state compliance within the range of 3 to 7 which comprises adding continuously to a reaction zone ethylene and an inert non-polymerizable solvent, polymerizing the ethylene in said reaction zone in the presence of a catalyst formed by admixing a soluble titanium compound of the class consisting of titanium salts and titanium alkoxides with a compound having at least one metal-to-hydrocarbon bond, wherein at least one of the catalyst components has at least one metal-to-halogen bond, maintaining said reaction zone at a temperature of at least 150° C. and at a pressure of above the critical pressure of ethylene, and maintaining in said reaction zone an excess ethylene in said non-polymerizable solvent and continuously recovering a polymer of ethylene having a steady state compliance of 3 to 7 and a melt index within the range of 0.005 to 10.

4. The process as set forth in claim 3 wherein the catalyst is formed by admixing titanium tetrachloride with a lithium aluminum tetraalkyl.

5. The process as set forth in claim 4 wherein the mol ratio of the titanium tetrachloride to the lithium aluminum alkyl is from 0.4 to 1.4.

6. The process as set forth in claim 4 wherein the lithium aluminum alkyl is lithium aluminum tetradecyl.

7. The process as set forth in claim 3 wherein the catalyst is formed by admixing titanium tetrachloride with an aluminum trialkyl.

8. The process as set forth in claim 7 wherein the aluminum trialkyl is aluminum triisobutyl.

9. The process as set forth in claim 3 wherein the catalyst is formed by admixing tetraisopropyl titanate and diethyl aluminum bromide.

10. The process as set forth in claim 3 wherein the catalyst is formed by admixing diisopropoxy titanium dichloride and aluminum triisobutyl.

11. The method of controlling the polymerization of ethylene so as to produce polyethylene of any desired melt index within the range of 0.005 to 10, which comprises introducing continuously into a reaction zone ethylene and an inert liquid hydrocarbon, polymerizing the ethylene in said reaction zone in the presence of a catalyst formed by admixing a titanium compound soluble in said hydrocarbon medium with a compound having at least one metal-to-hydrocarbon bond, maintaining the temperature of the reaction mixture at a temperature of at least 150° C., and maintaining the polymer and excess ethylene in solution, varying the temperature from 150° C. to 300° C. to obtain a change in log melt index of 0.025 to 0.050 for every degree change in temperature in the resulting polymer, and continuously removing a solution of said polymer and excess ethylene.

12. The method as set forth in claim 11 wherein the catalyst is formed by admixing a titanium tetrachloride and aluminum triisobutyl.

13. The method of controlling the polymerization of ethylene so as to produce polyethylene of any desired melt index within the range of 0.005 to 3.0 which comprises introducing continuously into a reaction zone ethylene under a pressure above the critical pressure of ethylene, polymerizing the ethylene in the said zone in the presence of a catalyst formed by admixing titanium tetrachloride with lithium aluminum tetraalkyl in an inert non-polymerizable organic anhydrous reaction medium, the mol ratio of titanium tetrachloride to lithium aluminum tetraalkyl being within the range of 0.4:1 to 1.4:1, the temperature being so chosen that, when the said ratio is 0.4:1, the temperature is 150° C. if a melt index of 0.005 is desired, varying to 230° if a melt index of 1.5 is desired, and when the said ratio is varied to 1.4:1, the temperature is varied from 150° if a melt index of 0.008 is desired, and to 230° if a melt index of 3 is desired, and thereafter separating polyethylene of the desired melt index from the resulting product.

14. The process as set forth in claim 13 wherein the non-polymerizable solvent is cyclohexane.

15. The process as set forth in claim 13 wherein the lithium aluminum tetraalkyl is lithium aluminum tetradecyl.

16. The process set forth in claim 13 wherein the ethylene pressure is above 150 atmospheres.

17. A continuous process for polymerizing ethylene to a solid polymer with a predetermined melt index within the range of 0.005 to 10, which comprises introducing an inert liquid hydrocarbon solvent and liquid ethylene at a weight ratio of greater than 5 to 1 of solvent to ethylene into a reaction zone in the presence of a catalyst, said catalyst being the reaction product obtained by admixing a titanium halide with an organometallic compound having at least one hydrocarbon radical bonded to metal in a molar ratio of 0.27 to 1.7 at a temperature of 150° C. to 300° C. and a pressure above the critical pressure of ethylene, maintaining an excess of ethylene in said system, and continuously removing a solution of polymer and excess of ethylene.

References Cited in the file of this patent

UNITED STATES PATENTS 2,721,189    Anderson et al. _____ Oct. 18, 1955

FOREIGN PATENTS 502,597    Canada _____ May 18, 1954
533,362    Belgium _____ May 16, 1955